Oct. 8, 1946.    C. A. SCHRINER    2,408,887
SCREW DRIVER
Filed June 18, 1943
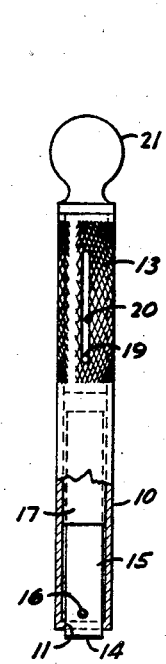
Fig. III
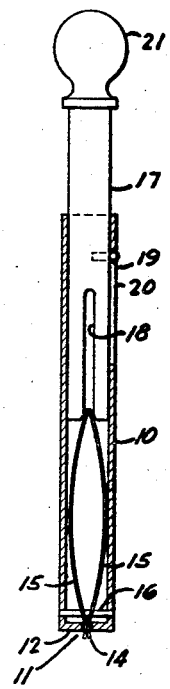
Fig. I
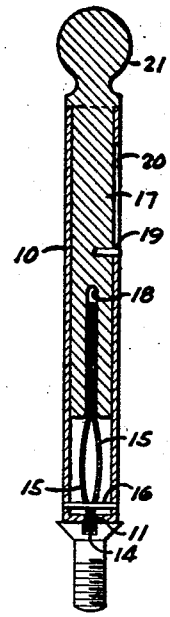
Fig. II
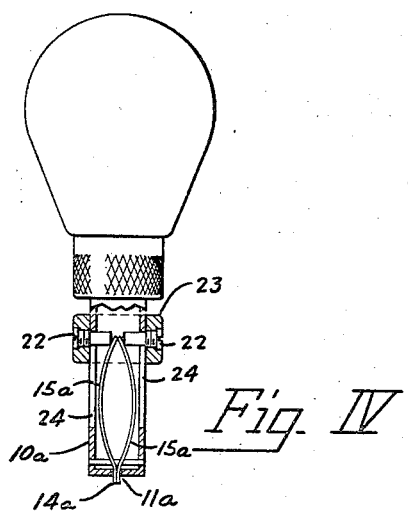
Fig. IV
INVENTOR.
Carl A. Schriner
BY
Marshall & Marshall
ATTORNEYS Patented Oct. 8, 1946

2,408,887

UNITED STATES PATENT OFFICE 2,408,887

SCREW DRIVER

Carl A. Schriner, Defiance, Ohio, assignor of one-half to Lester A. Snyder, Defiance, Ohio Application June 18, 1943, Serial No. 491,281

5 Claims. (Cl. 145—50)

This invention relates to screw drivers and in particular to screw drivers equipped with means to grippingly hold the screw prior to and during driving. There have been proposed a number of arrangements of springs combined with or forming screw drivers for the purpose of grippingly engaging the kerf of a screw. In general, these all have considerable length of spring between the screw kerf and the body of the screw driver and as a result have considerable deflection and loss of grip when driving torque is applied.

The primary object of this invention is to reduce to a minimum the distance between the torsional support for the screw kerf engaging springs and the screw kerf, thus minimizing the torsional deflection and increasing the strength of the screw driver.

Another object is to increase the gripping effect by suitably shaping the springs to materially reduce the free length between the support and the screw kerf, and to engage the screw near the bottom of the kerf.

Another object is to provide a surface on the end of the screw driver to match the surface of the head of a screw thus minimizing any tendency toward buckling or misalignment when driving force is applied to the screw.

These objects and others apparent to those skilled in using tools of this nature are attained in a screw driver as shown in the drawing in which:

Fig. I is a side view, partly in section, showing the arrangement of the parts prior to gripping a screw.

Fig. II is a similar view, showing the position of the elements when the screw driver is in gripping engagement with a screw.

Fig. III is a front view, partly in section, showing the elements in the same position as in Fig. II, the screw being omitted.

Fig. IV is a side view, partly in section, showing a modification of the invention.

The preferred embodiment of the invention comprises a hollow shank member 10 open at one end and closed except for a slot 11 at the other end 12. The surface of the closed end 12 is made flat to provide a substantial area in contact with the screw head. It is, of course, possible to so shape the end surface to mate with other shapes of screw heads to accomplish the same object.

The exterior of the shank member 10 near the open end may be knurled as at 13 Fig. III or fitted with a handle as shown in Fig. IV.

The kerf of a screw to be held and driven is engaged by nibs 14 of a pair of resilient steel strips 15 which protrude from the slot 11 in the end 12 of the shank member 10. The resilient strips 15 are so formed that normally the portions within the shank member 10 taken together resemble a pointed ellipse while the nibs 14 protruding from the slot 11 lie together.

The nibs 14 may be formed straight as is indicated in Fig. IV or they may be formed with a small amount of reverse curvature as shown in Figs. I and II. It will be observed that in each form of the device the oppositely bowed resilient strips contact each other a short distance inwardly from their ends, viz., at the upper ends of the nibs 14, the contacting portions forming fulcrum means about which the nibs pivot when the resilient strips are forced together. The reverse curvature shown in Figs. I and II improves the gripping effect by concentrating the force near the bottom of the kerf.

The strips 15 are placed in the shank member 10 in such manner that the junctions of the curved portions with the nibs 14 are in the slot 11. A pin 16 passed through the strips 15 and shank member 10 near the slotted end 12 prevents any longitudinal derangement of the parts.

For the purpose of forcing toward each other the portions of the resilient strips 15 forming the elliptical shape and thereby causing the nibs 14 to diverge for the purpose of gripping the kerf of a screw a rod 17 having a slotted end portion 18 is slidably fitted into the shank member 10 so that its slotted end portion can be pushed over the elliptical portions of the resilient strips 15. A pin 19 in the side of the rod 17 cooperates with a slot 20 in the side of the shank member 10 to prevent twisting and to limit the longitudinal travel of the rod 17. A knob 21 on the exterior end of the rod 17 facilitates the manual operation of the rod 17.

The device is operated by withdrawing the rod 17 to the outer limit of its travel allowing the resilient strips 15 to assume their normal elliptical shape with the ends of the nibs 14 together. In this condition the nibs 14 are inserted into the kerf of a screw and the rod 17 pushed inward to the other limit of its travel, thereby flattening the elliptical shape and causing the ends of the nibs 14 to separate forcibly and grippingly engage the screw kerf as shown in Fig. II.

Fig. IV shows a modification of the invention in which the elliptical shape of the resilient strips 15a is flattened by screw members 22 set in a slidable collar 23 surrounding the tubular shank member 10a. The screw members 22 extend inwardly through slots 24 in the sides of the tubular shank.

The operation of this modification is the same as that of the preferred embodiment described, the difference being in the substitution of the collar 23 and screws 22 for the slotted rod 17. This modification materially reduces the required overall length. It will be noticed that in both the preferred embodiment and the modification the nibs 14 or 14a engaging the kerf of a screw are torsionally supported by the slot 11 or 11a closely adjacent to the head of the screw. Constructed in this manner, the torsional driving effort applied to the handle is transmitted to the resilient strips principally at the nibs 14 or 14a rather than as a twisting force at the upper portions of said strips. This construction, therefore possesses a strength and rigidity heretofore unattainable in screw drivers of this class.

Having shown this novel form of screw driver and pointed out its advantages, I claim:

1. In a screw driver adapted to grippingly engage a screw, in combination, a hollow tubular member closed at one end and having a slot in said closed end, curved resilient strips fitted within said tubular member, said resilient strips being bowed away from each other and having portions of reverse curvature protruding through the slot in said tubular member to engage the kerf in a screw, means preventing longitudinal motion of said strips in said tubular member, and a slotted member slidably mounted in said tubular member and adapted to force said strips together within said tubular member thereby separating the ends of the reverse curvature portions of said strips exterior of said tubular member to grippingly engage the kerf of a screw.

2. In a screw driver adapted to grippingly engage a screw, in combination, a hollow tubular member closed at one end and having a slot in said closed end, curved resilient strips fitted within said tubular member, said resilient strips being bowed away from each other and having nibs protruding through the slot in said tubular member to engage the kerf in a screw, said nibs being in contact a short distance inwardly of their ends to form fulcrum means about which said nibs pivot when said bowed strips are forced together, means preventing longitudinal motion of said strips in said tubular member, and a slotted member slidably mounted in said tubular member and adapted to force said strips together within the slotted portion of said slotted member thereby separating the nibs of said resilient strips exterior of said tubular member to grippingly engage the kerf of a screw.

3. In a screw driver adapted to grippingly engage a screw, in combination, a hollow tubular member closed at one end and having a slot in said closed end, curved resilient strips fitted within said tubular member, said resilient strips being bowed away from each other and having portions of reverse curvature protruding through the slot in said tubular member to engage the kerf in a screw, means preventing longitudinal motion of said strips in said tubular member, said protruding portions at all times extending beyond the slotted end of said tubular member a distance approximating the depth of a kerf of a screw, said slotted end being shaped to closely overlie the upper face of a screw head engaged by the protruding portions of said resilient strips, and a slotted member slidably mounted in said tubular member and adapted to force said strips together within said tubular member thereby separating the ends of the reverse curvature portions of said strips exterior of said tubular member to grippingly engage the kerf of a screw.

4. In a screw driver of the class described, in combination, a hollow tubular member closed at one end and having a slot in said closed end, oppositely bowed resilient strips positioned within said tubular member and having portions of reverse curvature terminating in nibs protruding through the slot in the end of said tubular member to a distance approximately equal to the depth of a screw kerf, means preventing longitudinal motion of said strips with respect to said tubular member, means operating on the portions of said strips within said tubular member to effect separation of the ends of the reverse curvature portions of said strips exterior of said tubular member, said slotted end of said hollow tubular member being formed so the slot therein may be positioned closely adjacent the kerf of a screw to be driven thereby causing the torsional driving effort to be transmitted to the screw by force applied to said strips closely adjacent to said nibs.

5. In a screw driver of the class described, in combination, a hollow tubular member closed at one end and having a slot in said closed end, oppositely bowed resilient strips positioned within said tubular member and having end portions in contact with each other a limited distance inwardly of their ends and terminating in nibs protruding through the slot in the end of said tubular member to a distance approximately equal to the depth of a screw kerf, means preventing longitudinal motion of said strips with respect to said tubular member, means operating on the oppositely bowed portions of said strips within said tubular member to effect separation of the ends of the portions of said strips exterior of said tubular member, said slotted end of said tubular member being formed so that the slot therein may be positioned closely adjacent the kerf of a screw to be driven, thereby causing the torsional driving effort to be transmitted to the screw by force applied to said strips closely adjacent to said nibs.

CARL A. SCHRINER.